United States Patent [19]

Wolensky et al.

[11] Patent Number: 4,956,851

[45] Date of Patent: Sep. 11, 1990

[54] MODEM WITH REMOTE SPEED-CHANGE CAPABILITY

[75] Inventors: Joel A. Wolensky, Silver Spring; William A. Dunn, Beltsville, both of Md.

[73] Assignee: Case Communications Inc., Columbia, Md.

[21] Appl. No.: 198,504

[22] Filed: May 25, 1988

[51] Int. Cl.$^5$ .............................................. H04B 1/38
[52] U.S. Cl. ......................................... 375/8; 375/13; 375/121
[58] Field of Search ..................... 375/7, 8, 13.96, 121; 370/79, 84; 364/517, 724, 825; 379/361, 386; 340/825.71

[56] References Cited

U.S. PATENT DOCUMENTS

| | | | |
|---|---|---|---|
| 4,335,464 | 6/1982 | Armstrong | 375/8 |
| 4,606,044 | 8/1986 | Kudo | 375/13 |
| 4,663,766 | 5/1987 | Bremer | 375/121 |
| 4,674,103 | 6/1987 | Chevillat et al. | 375/13 |
| 4,734,780 | 3/1988 | Iwata et al. | 375/13 |

OTHER PUBLICATIONS

"Rapid Training of a Voiceband Data-Modem Receiver Employing an Equalizer with Fractional-T Spaced Coefficients," Chevillat et al., 35 *IEEE Transactions on Communications*, vol. COM-35, No. 9, (Sep. 1987).

"Passband Timing Recovery in an All-Digital Modem Receiver," Godard, *IEEE Transactions on Communications*, vol. COM-26, No. 5 (May 1978).

"Multidimensional Signal Constellations for Voiceband Data Transmission," Gersho et al., *IEEE Journal on Selected Areas in Communications*, vol. SAC-2, No. 5, (Sep. 1984).

"Trellis-Coded Modulation with Redundant Signal Sets, Part II: State of the Art," Ungerboech, *IEEE Communications Magazine*, vol. 25, No. 2 (Feb. 1987).

"Trellis-Coded Modulation with Multidimensional Constellations," Wei, *IEEE Transactions on Information Theory*, vol. IT-33, No. 4, (Jul. 1987).

*Primary Examiner*—Douglas W. Olms
*Assistant Examiner*—Stephen Chin
*Attorney, Agent, or Firm*—Saidman, Sterne, Kessler & Goldstein

[57] ABSTRACT

A modem which can automatically switch between protocols at different signalling rates. The protocal with non-standard signalling rates has a training sequence which initially has distinctive frequency-domain characteristics. Thus, as soon as one modem begins to send a training sequence, the other modem can distinguish which training sequence has been started. Thus, speed changes between protocols at different signalling rates can be remotely initiated.

7 Claims, 7 Drawing Sheets

| 256 | 2976 | 128 |
|---|---|---|
| ALT 310 | RANDOM 320 | RATE SEQ. 330 |

FIG. 3A

| 256 | 256 | 4000 |
|---|---|---|
| DDOT 340 | ALT 310' | RANDOM 320' |

FIG. 3B

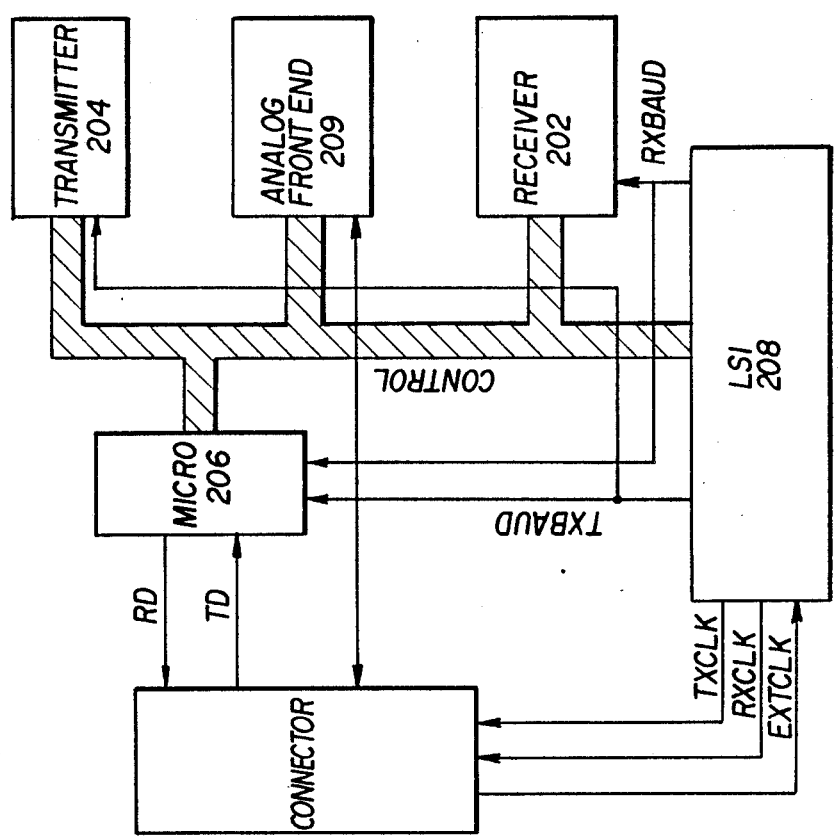

MODEM WITH REMOTE SPEED-CHANGE CAPABILITY

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent document or patent disclosure, as it appears in the U.S. Patent and Trademark Office patent file or records, but otherwise reserves all copyright rights whatsoever.

BACKGROUND OF THE INVENTION

The present invention relates to modem systems, which permit digital data to be efficiently transmitted over an analog channel. A particularly important class of modems is those which transmit data over telephone lines.

The existing telephone network provides such widespread and convenient linkage that it is highly desirable to be able to use it for data transmission. An important objective in such systems is to transmit data at the highest rate possible on the line being used.

In general, modems transmit pulses at a constant rate (the "signalling rate" or "baud rate"), and each pulse carries one of several "symbols." For example, if pulses are sent at 2400 pulses per second, and each pulse corresponds to one of 64 symbols, the resulting data rate will be 14,400 bits per second. (This is commonly written as 14400 bps, or 14.4 kbps.) That is, selecting one of 64 possible symbols is equivalent to specifying 6 bits of data, since $64=2^6$.

The set of available symbols is defined by whatever transmission protocol is being followed. Specifically, each symbol corresponds to a specific phase and amplitude value, with reference to a synchronous carrier. (This relation will be discussed in more detail below.) The set of all possible symbols is referred to as the "constellation." An example of a constellation is shown in FIG. 4.

Thus, to change the data rate, it is necessary to change the constellation, change the signalling rate, or both.

Changing the constellation is simpler than changing the signalling rate. When a pair of modems begin communications, one modem will transmit a standard sequence of patterns, which allows the other modem to "tune in" to the constellation which will be used. (This period is called the "training" period.) The last part of this sequence of patterns includes a code which specifies which constellation will be used.

Thus, for example, a change from 14400 bps to 9600 bps could be accomplished by changing constellations, without varying the signalling rate. In fact, a modem can be commanded *remotely* to make such a change. This is very advantageous, because it permits modems to shift speeds during a communication session.

Each modem normally includes a filter which is constantly watching for a strongly periodic signal. This filter will promptly detect when a training sequence is incoming, and initiate reception of the training operation. The last part of the training sequence will specify which constellation to use.

Thus, to change to a new constellation, one modem would simply begin to transmit the training sequence, instead of data. The other modem detects the training sequence, and, at the completion of this training sequence, the two modems will be able to communicate using the new constellation.

Using a constellation of 64 symbols rather than 16, at a signalling rate of 2400 pulses per second, increases the speed only from 9600 bps to 14400 bps. Similarly, to increase the data rate to 19200 at the same signalling rate, a constellation of 256 symbols would have to be used. Since the signal-to-noise ratio of a telephone line is limited, obtaining the high resolution required for such a constellation may be difficult. (In practice, the constellations actually used are enlarged to permit use of trellis coding. For example, 9600 bps protocols normally use a 32-point constellation, and 14400 bps protocols normally use a 128-point constellation.)

Therefore, for communication at 19200 bps, many modem protocols have slightly increased the signalling rate. Where the number of symbols is large, a small increase in the signalling rate can increase the data rate as much as a doubling of the number of symbols in the constellation. For example, for communication at 19200 bps, increasing the pulse rate by only 14%, from 2400 Hz ($=19200/8$) to 2742.86 Hz ($=19200/7$), means that only *half* as many symbols need be used. If pulses are sent at 2742.8 pulses per second, and each pulse can correspond to any one of 128 symbols, the resulting data rate will be 19,200 bits per second. (In practice, the 19200 bps protocol of the presently preferred embodiment actually uses a 160-point constellation, to permit implementation of coding schemes such as trellis coding.)

However, the use of a higher signalling rate introduces an incompatibility. Remotely initiated speed changes may become more difficult, where some of the protocols used do not have the same signalling rate. For example, a change from 14400 bps to 19200 bps (or vice versa) normally requires a change in the signalling rate.

Previously, modems have had much greater difficulty in detecting data-rate changes where a signalling rate change was necessary. Since most 19200 bps modems use an increased signalling rate, this difficulty has meant that most 19200 bps modems were not able to change speed reliably in response to a command from a remote modem.

A key objective in many telephone-line modem applications (and in other modem types as well) is to maximize the net data rate. However, the maximum possible data rate is limited by the characteristics of the channel. For example, the frequency bandwidth of a telephone line (in the United States) is typically only about 3,000 Hz, and the signal-to-noise ratio is also severely limited. This channel quality is adequate for voice transmission, but makes it difficult to achieve a high data transmission rate. From the Shannon theorem, the absolute theoretical maximum data rate which could fit within the minimum bandwidth and worst-case signal-to-noise standards for dial-up telephone lines (in the United States) would be about 30,000 bits per second ("bps"). However, this is a theoretical limit, which cannot be readily achieved in practice. Moreover, telephone connection quality will vary; some connections will be better than the minimum standard, and some will be worse.

The ability to remotely initiate a speed change, without requiring long training times or introducing significant error rates, is very desirable in telephone line modems. Since the transmission quality of telephone lines varies from line to line, and from minute to minute, it is highly desirable that the modem link should be able to adjust to these variable conditions. This is particularly desirable at higher maximum transmission rates, since a modem which is able to exploit a very good connection (at 19.2 or even 38.4 kbps) must be able to "fall back" to a much lower data if conditions worsen. Similarly, if such a modem has had to operate at a lower rate than its maximum, it is advantageous if the modem can "fall forward" (change to a higher transmission rate) if conditions improve.

It should be noted that not every idea discussed in the foregoing Background of the Invention section of the present application is necessarily prior art. For example, the discussion of technical alternatives may be colored by knowledge of some of the inventive concepts and their advantages. Moreover, some of the technical alternatives discussed may not be "prior art" under the patent laws of the United States or of other countries.

Similarly, the following Summary of the Invention section of the present application may contain some discussion of prior art teachings, interspersed with discussion of generally applicable innovative teachings and/or with specific discussion of the best mode as presently contemplated. Statements made in the Summary section do not necessarily delimit any of the various inventions claimed in the present application or in related applications. Moreover, some statements made in the Summary section may apply to some inventive features but not to others.

SUMMARY OF THE INVENTION

The present invention provides a high-speed modem with improved flexibility for speed changes, including speed changes between protocols which have different signalling rates.

The present invention provides an initial training sequence portion, at the higher signalling rate, which is readily distinguishable from the first part of the training sequences used at the lower signalling rate.

In the standard 14400 bps modem protocol (CCITT protocol V.33), the first part of the training sequence is selected to provide a large amount of energy at the band edges. (This helps to provide rapid acquisition of clock phase.) This practice has been followed in many other modem protocols too. However, according to the present invention, the first part of the training sequence in one mode is defined so that it includes energy peaks which are shifted *away* from the band edges. This goes against the conventional wisdom, but has the advantage of providing rapid discrimination between incompatible protocols.

In fact, the presently preferred embodiment transmits an initial pattern (to begin training in one possible protocol) which has a spectrum in which the carrier frequency is suppressed. The use of such a suppressed-carrier pattern provides even greater potential for simple filtering methods to distinguish among possible protocols at two (or more) different signalling rates.

A filtering operation is used to distinguish between the two possible types of initial training sequence. That is, the use of a modified initial portion for the training sequence provides spectral characteristics which are very easily recognizable.

Preferably a *differential* filtering operation is used, to protect against false alarms due to a sudden increase in the signal level (a "gain hit"). That is, in the case of FIG. 1A, a sudden increase in the overall signal level would also cause an increased power to be detected, in the frequency domain, at frequencies C and H. Such events should not be allowed to trigger a false decision that a training sequence is being transmitted.

BRIEF DESCRIPTION OF THE DRAWING

The present invention will be described with reference to the accompanying drawings, wherein:

FIG. 3A schematically shows the sequence of patterns which would be transmitted during the training period for communications at 9600 or 14400 bps, and FIG. 3B schematically shows the sequence of patterns which would be transmitted, according to the present invention, during the training period for communications at 19200 bps.

FIG. 6 schematically shows the hardware structure, including three signal processing chips and one control processor, which is preferably used to implement the modem of the present invention.

DESCRIPTION OF THE PREFERRED EMBODIMENTS

The innovative teachings of the present application will be described with particular reference to the presently preferred embodiment, wherein these teachings are advantageously applied to a 19200 bps modem which uses a 160-point constellation at a signalling rate of 2743 Hz, and which can also fall back to V.33 protocol at 2400 Hz, at 14400 bps. This embodiment can also fall back further to a modified protocol, which is very similar to the V.33 protocol but which runs at 9600 bps.

However, it should be understood that this embodiment is only one example of the many advantageous uses of the innovative teachings herein. For example, the various teachings disclosed herein can optionally be adapted to higher- or lower-rate modems, to modems (such as high-speed modems) other than telephone-line modems, to facsimile-machine modems, or to other M-ary QAM applications which require flexibility in shifting between protocols with different signalling rates.

Data Constellations in M-ary QAM

The present invention is particularly directed (but not necessarily limited) to systems using quadrature amplitude modulation ("QAM"). In QAM, two signals are modulated onto the same carrier frequency in phase quadrature. Demodulation of the signal (with respect to a synchronous carrier) yields two parameters, phase and amplitude.

The "constellations" referred to above are implemented using M-ary QAM (where the number of available symbols at each pulse is referred to as M). The set of permissible combinations of phase and amplitude defines the constellation, i.e. the set of possible symbols.

To decode the symbols, it is first necessary to demodulate each received pulse, with reference to a synchronous carrier frequency. This provides a phase and amplitude estimate for each received pulse. Decision logic then finds the best match of this phase and amplitude to one of the points in the constellation. A decoding operation then translates the received constellation point, to define $\log_2 M$ bits of data output.

For example, one way to encode a data rate of 19.2 kbps would be to use a constellation with 128 permissible data points ("symbols"), at a pulse rate of 2742.8 ($=19,200/7$) sec$^{-1}$. Such a constellation would normally include all combinations of the 12 permissible nonzero values of the in-phase component and the 12 permissible nonzero values of the quadrature component, except for the four blocks of four points at each of the four corners of the constellation. Thus, the general appearance of the constellation would be cross-shaped. (Excluding a few of the phase/amplitude combinations near the corners of the constellation helps to reduce error rate.)

Figure 4:
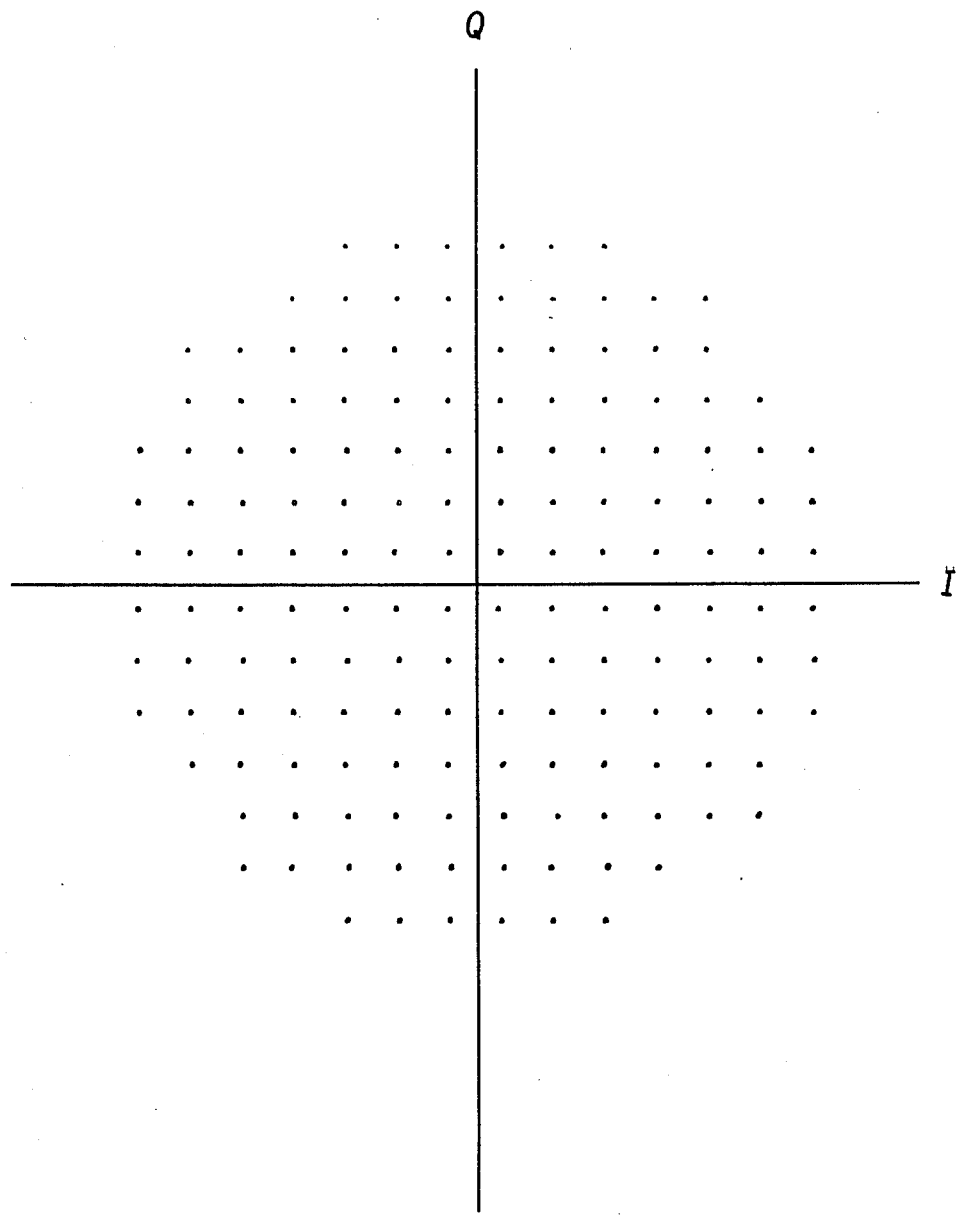
FIG. 4 shows a sample data constellation for use with a 19200 bps modem.

In the sample constellation of FIG. 4, the two orthogonal signal components modulated onto the carrier are represented as an in-phase ("I") component and a quadrature ("Q") component. Each of these components can take one of 14 levels. Since some combinations of levels are excluded, the total number of available I/Q combinations is 160. Note that, although only 7 bits of data are required to be encoded at each symbol, the number of points in the constellation of FIG. 4 is actually 160, not 128. These additional points are used to implement a trellis coding protocol.

General Architecture of Modem Receiver

The organization and key elements of the modem system context of the presently preferred embodiment will now be described. Since the demodulation and decoding functions are generally more difficult than the encoding and modulating functions, the following description will primarily emphasize the operations in the modem receiver. The complementary operations in modem transmitter are much simpler, and will be immediately apparent to those skilled in the art.

Figure 5:
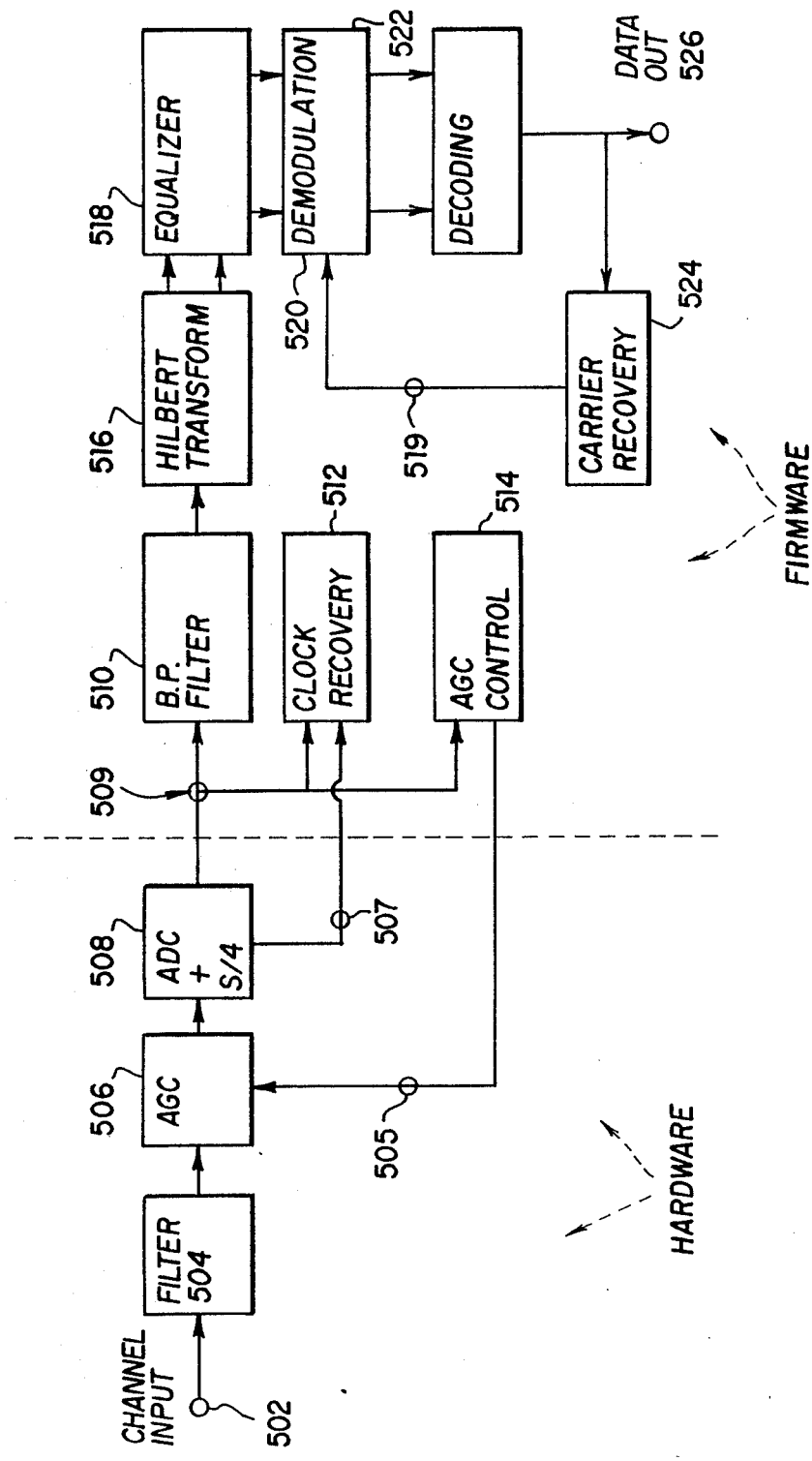
FIG. 5 shows the general architecture of a modem receiver, wherein the innovative teachings of the present invention may be advantageously employed.

FIG. 5 shows the general architecture of a modem receiver. An incoming signal 502, received from a channel of some sort (e.g. a telephone line), is passed through an anti-aliasing filter stage 504 (which may include preamplification if needed). The filtered signal is further level-adjusted by an analog automatic gain control (AGC) stage 506 (which is governed by a gain-control signal 505). The analog signal is now supplied to a sampling converter 508, which samples it at intervals determined by a control signal 507, and provides a corresponding digital output. The sampled signal 509 is now provided to an AGC control stage 514, which provides feedback 507 to the analog amplifier 506 based on the digital signal values. The sampled signal 509 is also provided to a clock recovery stage 512. This stage monitors the timing of the separate pulses. (The pulse timing is referred to as the "baud clock.") Thus, clock recovery stage 512 tracks the phase of the baud clock, and accordingly provides a timing signal 507 to the sampling converter 508.

The sampled signal 509 is now conditioned by bandpass filter 510, Hilbert transform stage 516, and adaptive equalizer stage 518. (Note that the Hilbert transform stage 516 provides a complex output, so that two signal streams are shown from Hilbert transform stage to decoding stage 522.) The signal thus conditioned is demodulated by demodulation stage 520, with reference to the recovered carrier signal 519 provided by carrier recovery stage 524. The demodulated values are then decoded (stage 522), to produce digital output data 526. The decoding operation 522 preferably uses coding logic (including multidimensional coding, trellis coding, convolutional encoding) as described, for example, in Ungerboeck, *Trellis-coded Modulation Redundant Signal Sets: Part 2: State of the Art*, IEEE Communications Magazine, February, 1987; in Wei, *Trellis-coded Modulation with Multidimensional Coding*, 33 IEEE Trans'ns in Information Theory 483 (July 1987); and in Gersho and Lawrence, *Multi-dimensional Signal Constellations for Voice Band Data Transmission*, 2 IEEE Journal on Selected Areas in Communications 687 (Sept. 1984); all of which are hereby incorporated by reference.

An overview of the elements of a modem may be found, for example, in Chevillat et al., "Rapid Training of a Voiceband Data-Modem Receiver Employing an Equalizer with Fractional-T Spaced Coefficients," 35 *IEEE Transactions on Communications* 869 (1987)(which is hereby incorporated by reference). A complete modem receiver will normally include automatic gain control (AGC) circuitry, an adaptive equalizer, sampling and clock recovery stages, carrier recovery and demodulation stages, and a decoding stage. The general outline of all of these is well-known to those skilled in the art. Additionally, a complete modem will also include a transmitter side, which must include encoding and modulation stages, as well as control logic.

Many modems use error-detection or error-check-and-correct algorithms, in which check bits are encoded with the data. A wide variety of such algorithms are known. However, in any case, it is always desirable to reduce the raw pulse error rate. In an M-ary QAM system, achieving a low raw error rate requires an accurate estimation of the phase of each pulse.

One known way to recover the clock phase of a QAM telephone line modem is described (e.g.) in D. N. Godard, "Passband Timing Recovery in an All-Digital Modem Receiver," IEEE Transactions on Communications, Vol. COM-26, No. 5, May 1978 (which is hereby incorporated by reference). However, in the system context of the presently preferred embodiment, this function is actually performed using (1) a stage which provides an initial estimate of clock phase; (2) a smoothing filter, which filters the initial estimate to reduce jitter levels; and (3) a frequency offset tracker, which can track the incoming clock even when a significant frequency offset exists. (Extensive discussion of this technique is found in U.S. patent application Ser. No. 141,499 of common assignee, which is hereby incorporated by reference.)

Note that clock recovery is not the same thing as carrier phase recovery. Clock recovery provides the correct timing to sample the incoming signal to correctly recover the symbol being transmitted at each baud interval. The carrier recovery process, by contrast, provides a phase reference to demodulate the sampled data, and thereby decode the symbol. (Extensive discussion of an advanced technique for carrier recovery, which is actually used in the system context of the presently preferred embodiment, is found in U.S. patent application Ser. No. 090,483 of common assignee, which is hereby incorporated by reference.)

Hardware and Software Implementation

FIG. 6 schematically shows the hardware structure, including three signal processing chips and one control processor, which is preferably used to implement the modem of the present invention. In this layout, two digital signal processing chips (both TMS320C25) are used at location 202. One performs most of the receiver functions except decoding, and the other decodes the demodulated signals. Digital signal processing chip 204 is preferably an NEC 7720, and performs the transmit functions. Microprocessor 206 is a general-purpose performs control overhead tasks, and is preferably an Intel 8031. Custom LSI chip 208 implements a programmable divider, to serve as a local oscillator. Analog chip 209 performs the major analog functions, including anti-aliasing filtering, sampling, and conversion.

Training and Re-Training

The functions performed during training will now be discussed. The way in which training sequences such as those of FIGS. 3A and 3B permit any one of two or more possible signalling rates to be acquired will then be discussed.

General Function of Training Period

The general purpose of the training period is to permit the transmitting and receiving modems to modulate and demodulate accurately with reference to a common data constellation, such as that shown in FIG. 4. That is, when one modem (whichever one is transmitting) sends a signal corresponding to one of the 160 points in the data constellation of FIG. 4, it is necessary that the other modem (the one which happens to be receiving) should identify the received signal as corresponding to the same one of the data points as was intended to be sent.

Figure 2:
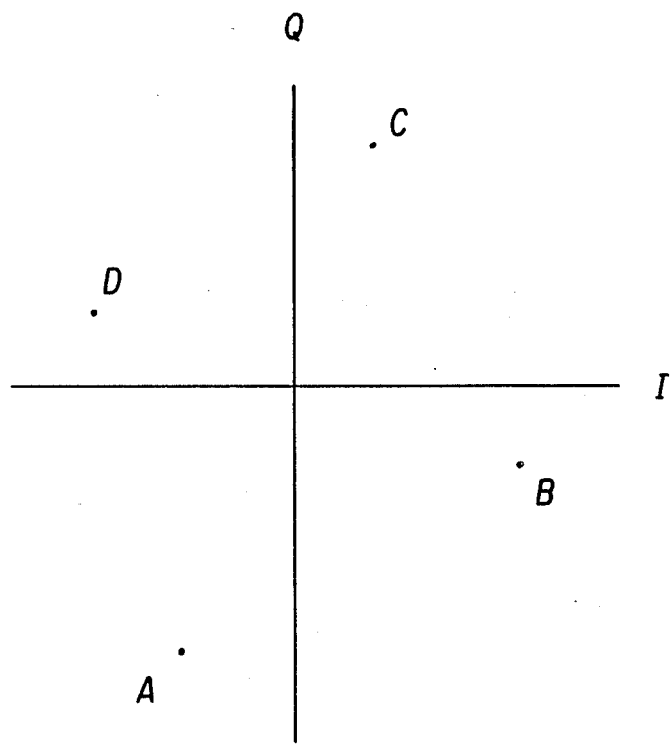
FIG. 2 is a phase and amplitude plot, which schematically shows the reduced constellation used for training, when two modems are initiating communication.

To attain this close correspondence, a predetermined "pseudo-random" sequence of points is sent during the training period. This pseudo-random sequence includes only a few points of the constellation. Instead, a reduced constellation with only four points is normally used, such as points A, B, C, and D in FIG. 2.

This pseudo-random sequence is selected to provide a broad frequency spectrum, just as random data would. However, since this pseudo-random sequence is known a priori, the receiving modem can compare its estimates with the correct values in this sequence, to derive appropriate corrections. (In practice, the parameters of the equalizer 518 are adjusted to achieve these corrections.)

However, before the pseudo-random sequence is sent, an initial sequence is sent, to advise the receiving modem that a training sequence is being initiated.

Of course, many variations in training sequences can be used, as is well known to those skilled in the art. Thus, the innovative teachings set forth herein can be adapted for use in a wide variety of other contexts.

Initializing Training Under V.33

FIG. 3A shows the training sequence (defined by CCITT protocol V.33) used to initiate modem communications at 14400 bps, under the V.33 protocol. In the V.33 protocol, as in many modem protocols, training is initiated by a repetitive sequence of dots in a reduced training constellation (like that of FIG. 2).

During the period marked "ALT," an alternating sequence of symbols is transmitted. (In the presently preferred embodiment, and in accordance with the V.33 protocol, this sequence is ABABABAB . . . , where A, B, C, and D are the four points shown in the reduced constellation of FIG. 2.)

Normally, a high-speed telephone-line modem will contain filters which operate essentially continuously, while the modem is in data mode, and which are programmed to detect strongly periodic signals. Such a signal could result from the alternating sequence of symbols (ABABAB . . . ) which begins a training period. Thus, if such a strongly periodic signal is received for a sufficiently long time, the receiving modem can recognize that a new training sequence has been initiated. The receiving modem can then allow itself to be trained in accordance with the protocol is being transmitted.

During the period marked "RANDOM," the pseudo-random sequence of symbols A, B, C, and D is transmitted.

During the period marked "Rate Seq," a short coded sequence is transmitted which identifies whether the ensuing data will be transmitted using a 32-point constellation (9600 bps) or a 128-point constellation (14400 bps).

In the presently preferred embodiment, a slight modification of the V.33 training sequence is used to initiate communication at 9600 bps. The V.33 standard provides two bits of data which are encoded into the rate sequence portion. One of these bits specifies that 12000 bps is permitted, and the other specifies that 14400 bps is permitted. However, the V.33 standard does not specify any result when these two bits specify that neither 12000 nor 14400 bps is permitted. In the presently preferred embodiment, this condition is used to specify 9600 bps communication. During 9600 bps communication, the presently preferred embodiment uses the V.32 constellation.

Initializing at New Signalling Rate

FIG. 3B shows a novel training sequence, which is used to initiate modem communications at 19200 bps in the presently preferred embodiment. The periods marked "ALT" and "RANDOM" are generally similar to the corresponding periods in FIG. 3A, except that they occur at a higher signalling rate (2742.8 per second instead of 2400 per second). During the period marked "DDOT," a "double-dotted" sequence is transmitted. (In the presently preferred embodiment, this sequence is AACCAACCAACC . . . , where A, B, C, and D are the four points shown in the reduced constellation of FIG. 2.)

Figure 1A:
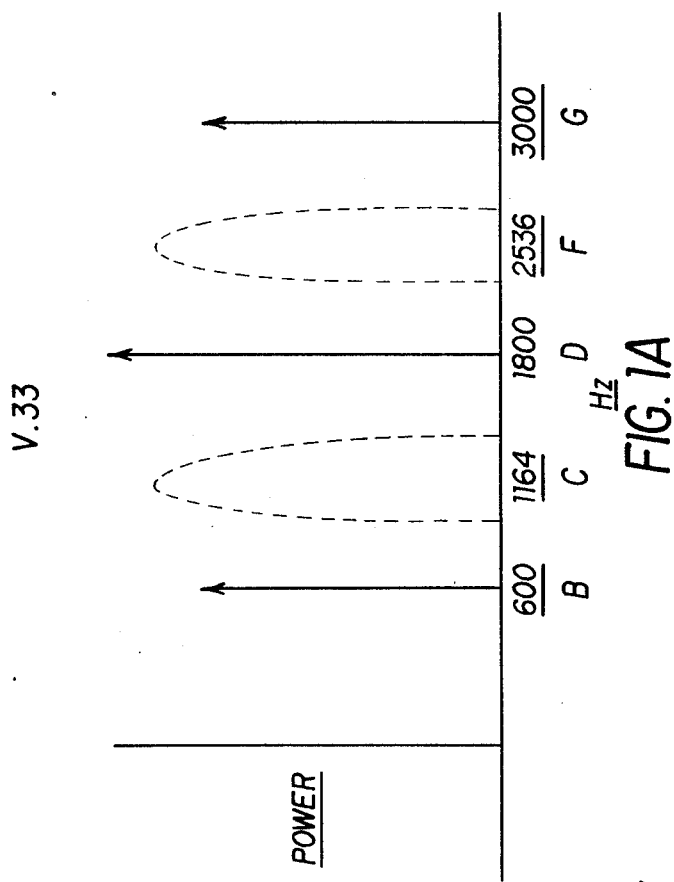
FIGS. 1A and 1B show frequency spectra of training patterns for two different data rates.
Figure 1B:
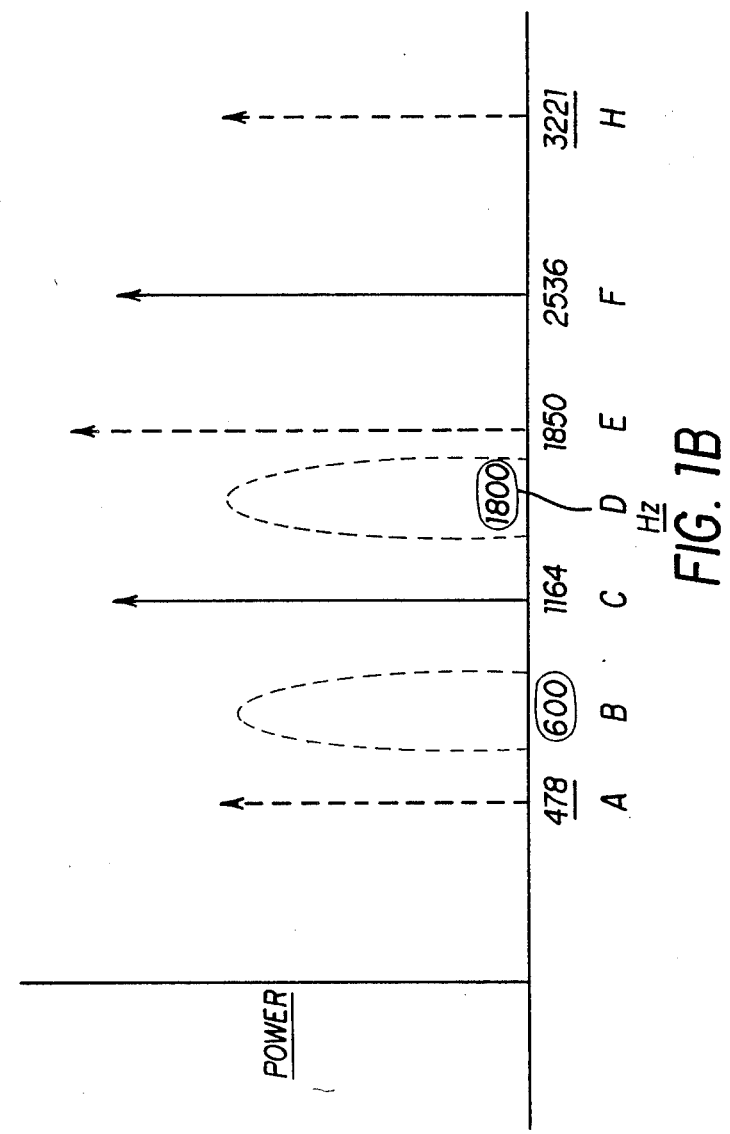

An outstanding advantage of this DDOT period is that the spectral characteristics of the DDOT period at 2743 Hz are very different from those of the ALT period at 2400 Hz. FIG. 1A shows a diagram of frequency versus power, for the ABABAB . . . pattern at 2400 Hz. This spectrum is very simple: it includes a spike at the carrier center frequency, and two other narrow peaks at 1200 Hz (i.e. half the signalling rate) above and below the center frequency. FIG. 1B shows a diagram of frequency versus power, for the AACCAACCAACC . . . pattern at 2742.8 Hz. This spectrum too is very simple: it includes essentially no energy at the carrier center frequency (set at 1850, in this example), and only two narrow peaks, which are separated from the center frequency by ± one-quarter of the signalling frequency (2742.8/4). (The use of 180° alternations in this initial pattern provides a spectrum in which the carrier is suppressed.)

As shown by the dotted envelopes overlaid on the spectra of FIGS. 3A and 3B, a very simple filtering operation can be used to distinguish between the two possible types of initial training sequence. That is, the use of a modified initial portion for the training sequence provides spectral characteristics which are very easily recognizable.

In the presently preferred embodiment, four filters are operated essentially continuously: one tracks the lower band-edge; one tracks the upper band-edge; and two are used to detect frequency spikes which would result from training at a different signalling rate. Three of these filters (all but the filter which tracks the upper band-edge) are used to detect speed-change training. Thus, while operating under the V.33 protocol (as shown in FIG. 1A), these four filters are operated at frequencies B (600 Hz), C (1164 Hz), F (2536 Hz), and G (3000 Hz). The onset of a training signal at 19200 bps is identified if, while data lock has been lost, frequencies C and F show power output above a certain (high) threshold while frequency B shows power output below a certain (low) threshold, for a specific minimum duration.

In the presently preferred embodiment, these intensity measurements are made by a digital filtering operation which is upstream of the equalizer. (However, it is downstream of the automatic gain control (AGC) function.) The specific threshold levels within the digital filtering operation will now be specified, for completeness of description, in the manner in which those levels are actually specified in the presently preferred embodiment. The analog to digital converter provides output values on an arbitrary scale of 0(H) to 7FFF(H). Thus, a "full scale" analog input level is assigned the value of 7FFF(H), and any larger input level would be clipped. The AGC circuit is set to adjust overall average level of the signal to a level which, within this scale, corresponds to a value of 4800(H). Within this scale, the threshold tests applied are:

the high threshold test is positive if the output of the particular frequency bin being tested continuously exceeds a scaled value of 4800(H) for 100 bauds (i.e. for the duration of 100 incoming pulses);

the low threshold test is positive if the output of the particular frequency bin being tested is continuously less than a scaled value of 1000(H) for 100 bauds. (Numbers with an H after them are expressed in hexadecimal notation. For example, F(H)=15, 10(H)=16, 4800(H)=18,432, 7FFF(H)=32,767, and 1000(H)=4096.)

Once a changeover to reception at 19200 bps has been made, these four filters are reprogrammed, so that they are tracking frequencies A (478 Hz), B (600 Hz), D (1800 Hz), and H (3221 Hz) respectively. The decision to change speeds is made if (while data lock has been lost) large power levels are detected at frequencies B and D, and much lower power level is detected at frequency A.

In the presently preferred embodiment, the bandwidth of these four filters is also switched. When the signalling rate is 2400 Hz, each of these filters has a bandwidth of 50 Hz, and when the signalling rate is 2743 Hz, each of these filters has a bandwidth of 57 Hz. (The bandwidth is specified in Hertz, as is customary with digital filters.)

Of course, the particular frequencies used are determined by the choice of carrier frequency and signalling rate. For example, the spectrum of FIG. 1B assumes a carrier center frequency (frequency E) of 1850 Hz. Frequencies C and F are equal to frequency E plus or minus one quarter of the signalling rate, and frequencies A and H are equal to frequency E plus or minus one half of the signalling rate. As will be recognized by those skilled in the art, a given data rate can be achieved using a wide variety of carrier frequencies and signalling rates.

Thus, a double-dot initial training sequence could be introduced for rapid discrimination in systems using other protocols, even if the carrier frequency and signalling rates were quite different from those of the presently preferred embodiment.

It should also be noted, even more generally, that the teachings of the present invention can optionally be adapted to use still other patterns, which differ from the double-dot pattern and also from the normal alternating-dot training pattern. Such other patterns can be chosen, within the context of a simplified constellation subset used for training, to provide frequency-domain spikes which are far removed from the carrier frequency and band edges.

For example, a "triple-dot" pattern of AAACC-CAAACCC ... (at the same carrier frequency and signalling rate) would have a spectrum somewhat similar to that of FIG. 1B, except that the two spikes C and F would be shifted to frequencies of 1393 Hz and 2307 Hz. (That is, in this example, the two frequency spikes of the triple-dot pattern would be separated from the center frequency by one-sixth of the signalling rate, rather than one-quarter.)

Other repeating patterns of dots within a reduced constellation subset could less preferably be used, instead of the double-dot pattern of the presently preferred embodiment, to provide a spectrally distinctive initial segment. For assessing such alternative candidates, the preferred criteria are that a simple repeating pattern should be used, which does not carry substantial energy at the band edges. Preferably, this pattern should also not carry substantial energy at the carrier center frequency.

In addition, it should be noted that some repeated dot patterns will differ only by a constant phase rotation, and therefore have the same frequency-domain characteristics. For example, a double-dot pattern of BBDDBBDDBBDD ... would have the *same* spectrum as the AACCAACCAACC ... double-dot pattern of the presently preferred embodiment, and could therefore readily be substituted.

Note that, to avoid false initiation of speed-change, the filtering operation is done differentially. That is, while operating at 14400 bps, a speed change up to 19200 bps operation would be initiated only if the energy at frequencies C and F is high *AND* the energy at frequency B is low. This provides stability in the speed change operation. In particular, this differential filtering protects against false alarms due to an increase in noise or attenuation.

However, note that the upper band-edge frequency G (3000 Hz in this example) is not used for this decision, even though this frequency is being filtered and tracked. This is because the varying characteristics of the channel may sometimes impose some high-frequency roll-off. The energy at the upper band edge is therefore not as reliable a gauge.

From the foregoing description, it may be seen that the logical operations required to test the outputs from these filters are minimal. In the presently preferred embodiment, these tests are performed in the general-purpose DSP chips 202. When the DSP chips 202 detects that one of the foregoing decision thresholds has been met, the DSP chip sends a message to the microprocessor 206.

Once the general-purpose microprocessor 206 detects that a signalling-rate change has been commanded, it commands the receiver chip to change the signalling rate and the filter parameters. However, it will still be necessary for the modem at the other end to send a second training sequence, before the receiver is able lock in to the new constellation.

If the training operation is successful, the receiving modem will send an acknowledge signal to the modem which initiated the training.

In the presently preferred embodiment, the transmitting modem will make only three attempts to train. If three attempts are not successful, the transmitting modem will fall back to a lower speed (if one is available).

Thus, the innovative teachings set forth in the present application are particularly advantageous in modems which can shift between V.33 and higher-rate standards. However, these teachings can also be used to provide greater flexibility in the number of protocols to which a modem is able to interface to. For example, the innovative teachings set forth above could even be adapted to permit a modem to discriminate between two different 19200 bps protocols on the fly. Such applications may be particularly advantageous in the future, since no standard protocol for 19200 bps communication has yet been universally accepted.

As will be recognized by those skilled in the art, the innovative concepts described in the present application can be modified and varied over a tremendous range of applications. Accordingly, the scope of the innovative concepts is not limited except by the claims.

What is claimed is:

1. A modem receiver, comprising:
means for being trained by, selectably, either a first training sequence, corresponding to a first protocol at a first signalling rate, or a second training sequence, corresponding to a second protocol at a second signalling rate different from said first signalling rate, wherein said first and second training sequences have respective first and second initial portions with respectively different spectra;
a filter connected to repeatedly
test an incoming signal for the presence of a first frequency which is strongly present in said first initial portion and not in said second initial portion, and
test the incoming signal for the presence of a second frequency which is strongly present in said second initial portion and not in said first initial portion;
decision logic connected to selectively activate said means for being trained, to be trained in accordance with said first protocol, if said filter detects a much higher energy level at said first frequency than at said second frequency, or in accordance with said second protocol, if said filter detects a much higher energy level at said second frequency than at said first frequency; and
wherein said initial portion of said first training sequence has a spectrum with high energy density at band-edge frequencies of said first protocol, and said initial portion of said second training sequence has a spectrum with low energy density at band-edge frequencies of said first protocol.

2. The modem receiver of claim 1, wherein said initial portion of said second training sequence is followed by a second portion having a spectrum with high energy density at band-edge frequencies of said second protocol.

3. A modem receiver, comprising:
means for being trained by, selectably, either a first training sequence, corresponding to a first protocol at a first signalling rate, or a second training sequence, corresponding to a second protocol at a second signalling rate different from said first signalling rate, wherein said first and second training sequence have respective first and second initial portions with respectively different spectra;
a filter connected to repeatedly
test an incoming signal for the presence of a first frequency which is strongly present in said first initial portion and not in said second initial portion, and
test the incoming signal for the presence of a second frequency which is strongly present in said second initial portion and not in said first initial portion;
decision logic connected to selectively activate said means for being trained, to be trained in accordance with said first protocol, if said filter detects a much higher energy level at said first frequency than at said second frequency, or in accordance with said second protocol, if said filter detects a much higher energy level at said second frequency than at said first frequency; and
wherein said first training sequence has a spectrum with high energy density at band-edge frequencies, and said second training sequence has a spectrum with low energy density at band-edge frequencies and low energy density at the carrier frequency of said second protocol.

4. A modem receiver, comprising:
means for being trained by, selectably, either a first training sequence, corresponding to a first protocol at a first signalling rate, or a second training sequence, corresponding to a second protocol at a second signalling rate different from said first signalling rate, wherein said first and second training sequences have respective first and second initial portions with respectively different spectra;
a filter connected to repeatedly
test an incoming signal for the presence of a first frequency which is strongly present in said first initial portion and not in said second initial portion, and
test the incoming signal for the presence of a second frequency which is strongly present in said second initial portion and not in said first initial portion;
decision logic connected to selectively activate said means for being trained, to be trained in accordance with said first protocol, if said filter detects a much higher energy level at said first frequency than at said second frequency, or in accordance with said second protocol, if said filter detects a much higher energy level at said second frequency than at said first frequency; and
wherein said filter provides at least three bandpass-filtered outputs, and said decision means selectively activates recognizing means in accordance with a logical combination of thresholded values of at least three outputs of said filter.

5. A modem system, comprising:

a transmitter portion, connectable to receive digital data, and programmed to modulate analog signals accordingly, with reference to any desired one of a plurality of protocols, wherein a first one of said protocols has a signalling rate different from a second one of said protocols;

a receiver portion, having a bandpass filter, connectable to receive analog signals, and programmed to demodulate said analog signals in accordance with any one of said plurality of protocols, wherein said receiver portion also applies multiple bandpass filter operations to said analog signals;

wherein said receiver portion begins training under said first protocol if, persistently over a predetermined minimum duration, a first frequency, which is strongly present in the initial portion of said first training sequence and not in the initial portion of said second training sequence, is strongly detected by said filter, and a second frequency, which is strongly present in said second training sequence and not in said first training sequence, is not substantially detected by said filter;

wherein said receiver portion begins training under said second protocol if, persistently over a predetermined minimum duration, said second frequency is strongly detected by said filter and said first frequency is not substantially detected by said filter; and wherein said initial portion of said first training sequence has a spectrum with high energy density at band-edge frequencies of said first protocol, and said initial portion of said second training sequence has a spectrum with low energy density at band-edge frequencies of said first protocol.

6. The modem system of claim 5, wherein said initial portion of said second training sequence is followed by a second portion having a spectrum with high energy density at band-edge frequencies of said second protocol.

7. A modem system, comprising:

a transmitter portion, connectable to receive digital data, and programmed to modulate analog signals accordingly, with reference to any desired one of a plurality of protocols, wherein a first one of said protocols has a signalling rate different from a second one of said protocols;

a receiver portion, having a bandpass filter, connectable to receive analog signals, and programmed to demodulate said analog signals in accordance with any one of said plurality of protocols, wherein said receiver portion also applies multiple bandpass filter operations to said analog signals;

wherein said receiver portion begins training under said first protocol if, persistently over a predetermined minimum duration, a first frequency, which is strongly present in the initial portion of said first training sequence and not in the initial portion of said second training sequence, is strongly detected by said filter, and a second frequency, which is strongly present in said second training sequence and not in said first training sequence, is not substantially detected by said filter;

wherein said receiver portion begins training under said second protocol if, persistently over a predetermined minimum duration, said second frequency is strongly detected by said filter and said first frequency is not substantially detected by said filter;

wherein said initial portion of said first training sequence has a spectrum with high energy density at band-edge frequencies of said first protocol, and said initial portion of said second training sequence has a spectrum with low energy density at band-edge frequencies of said first protocol; and wherein said first training sequence has a spectrum with high energy density at band-pass frequencies, and said second training sequence has a spectrum with low energy density at band-edge frequencies and low energy density at the carrier frequency of said second protocol.

* * * * *